United States Patent [19]

Golledge

[11] Patent Number: 5,375,957

[45] Date of Patent: Dec. 27, 1994

[54] IMPACT DRIVABLE FASTENER

[75] Inventor: Brad F. Golledge, Kirrawee, Australia

[73] Assignee: John Lysaght (Australia) Limited, New South Wales, Australia

[21] Appl. No.: 127,576

[22] Filed: Sep. 28, 1993

[30] Foreign Application Priority Data

Sep. 29, 1992 [AU] Australia ............................. PL5021
Mar. 2, 1993 [AU] Australia ............................. PL7588

[51] Int. Cl.⁵ ............................................. F16B 15/08
[52] U.S. Cl. ................................. 411/453; 411/394; 411/922
[58] Field of Search ............... 411/399, 452, 453, 454, 411/394, 922

[56] References Cited

U.S. PATENT DOCUMENTS

| 327,296 | 9/1885 | McGinnis | 411/454 |
| 340,692 | 4/1886 | Bailey | 411/452 |
| 1,891,895 | 12/1932 | Nagel | 411/453 |
| 2,056,688 | 10/1936 | Peterka et al. | 411/399 |
| 3,977,142 | 8/1976 | Dove et al. | 411/453 |
| 4,979,859 | 12/1990 | Gastleberry | 411/452 |

FOREIGN PATENT DOCUMENTS

| 2312683 | 12/1976 | France | 411/394 |
| 468601 | 1/1952 | Italy | 411/452 |
| 629722 | 9/1949 | United Kingdom | 411/452 |

Primary Examiner—Neill R. Wilson
Attorney, Agent, or Firm—Nikaido, Marmelstein, Murray & Oram

[57] ABSTRACT

An impact drivable fastener, suitable for fastening sheet metal articles, includes a shank extending from a tip (10) at one end, which tip is adapted to be driven through a metal sheet, and a head (10) at the other end. A large pitch multi-start thread formation (11), including ribs separated by flutes, is formed on a part of the shank. The depth of the flutes and the height of the ribs increases uniformly from zero at the starting end of the formation nearer to the tip to maximum values at a position adjacent the head.

8 Claims, 3 Drawing Sheets

IMPACT DRIVABLE FASTENER

FIELD OF THE INVENTION

This invention relates to fasteners for use in securing an article to a metal sheet, or for effecting a lap joint between two pieces of metal sheet or sheet like parts of two sheet metal articles.

The invention was devised for use in the construction of light duty, metal building frames, such as trusses, wall and partition frames and the like, that are comprised of roll-formed sheet metal members or elements, and is described primarily in that context herein. However, it will be apparent that fasteners according to the invention are useable quite generally for the affixture of items to thin metal sheet.

DESCRIPTION OF THE PRIOR ART

Conventional fasteners that have been used for the same purposes as the invention have comprised bolts, rivets, including blind or so-called pop rivets, and self-tapping screws. Bolts and conventional rivets can only be used if there is access to both ends of the fastener, and even then their installation is time consuming. Blind rivets are expensive two piece items. Self tapping screws have to be driven home by rotation, which is also a time consuming operation. Finally, most of these prior known fasteners have required the articles that are to be held together, that is the metal sheet and the article or second sheet, as the case may be, to be drilled or otherwise perforated, and the respective perforations to be brought into alignment to take the fastener. There are a few exceptions, such as that described in British patent specification No. 394,398 (Rosenberg), comprising screws fasteners with a plain tip, which tip is adapted to be driven by impact through two metal sheets to produce a perforation for accepting the threaded portion of the fastener.

Thus, prior known fasteners adapted for use in relation to sheet metal have all compared unfavorably, from the points of view of the cost of the fastener and the convenience of its use, with impact drivable nails, such as may be used in relation to timber articles.

As a result, sheet metal building and partition frames have not been as widely accepted by building trades people as might otherwise be the case. Such people usually have a preference for timber constructions because of the ease and convenience of nailed joints.

It is perfectly feasible to drive a conventional nail through a thin metal sheet, for example steel of up to 2 mm thickness such as used for roll-formed building and partition members, sheet metal vehicle body panels, domestic appliance cabinets and the like, using a conventional nailing gun. However such a nail is not tightly gripped by the sheet metal, especially if the nail, having been driven, is caused to tilt in the hole in the metal sheet by the forces applied to the parts being joined. This is because the sheet metal, when pierced by the nail, is ruptured in a way which leaves an ill-fitting, ragged hole with torn edges.

The same problem arises if known, helically fluted nails are used. Such a nail, by virtue of the flutes in the surface of its shank, has what is in effect a constant diameter, multi-start, long pitch thread extending along the shank from its pointed tip to near the head of the nail. Such nails provide a stronger grip in timber than that of plain or smooth shanked nails. Generally speaking they do not rotate when being driven in. Nevertheless the timber appears to recover and expand into the helical flutes, so as to oppose extraction of the nail in the absence of rotation. If such fluted nails are used into sheet metal their performance is variable and sometimes worse than that of plain nails. The hole that conventional fluted nails make in sheet metal appears to be comparable to that which would be made by a plain nail having a diameter equal to the crest diameter of the thread of the fluted nail. Thus little or no metal enters the flutes, and they are ineffective.

Other impact drivable nail type fasteners are known having projecting long pitch thread or flute formations extending along their shanks, for example those described in U.S. Pat. Nos. 1,619,944 (Leonard) and 2,291,751 (Oestereicher), and British patent No. 301,936 (Wells). Apart from short, lead-in tapers on the thread formation, and of course the tip of the nail, all of these are essentially constant diameter devices. They are intended for use in relation to timber or other mass substrates in which the driven nail is substantially embedded. There is no showing of the usefulness of such drivable threaded fasteners in relation to sheet metal.

SUMMARY OF THE INVENTION

Nevertheless an effective grip between a fastener and a thin metal sheet can be obtained if emplacement of the fastener causes the metal around the fastener clearance hole to flow without tearing so that the edge of the hole makes close, high friction contact with the fastener, as instanced by the security obtained by a conventional self tapping screw, even though there is minimal thread length (often less than a full turn) in actual contact between the screw and the thin metal sheet.

Therefore an object of the present invention is to provide a self-piercing, impact drivable fastener able to be used satisfactorily to secure articles, including sheet metal articles, to a sheet metal substrate, or to secure a sheet metal article to another substrate.

Conventional impact drivable fasteners, such as a nail, comprise a shank that usually has a pointed tip, at the end of the shank that pierces the item being nailed, and a head at the other end that is struck by the hammer. However this is not always so. Flat tipped nails are known, for use where it is preferable for the nail to punch through an article so as to reduce the prospect of the material splitting, and headless nails are known, for use where it is desired to fill the nail hole after the nail is driven below the surface and for that hole to be as small as possible. The same may apply to fasteners according to the invention.

The invention consists in an impact drivable fastener, comprising a shank extending from a shank tip to a shank end, wherein a surface formation comprising a plurality of ribs extends along at least a part of the shank, and wherein the height of the ribs increases gradually from zero value at a start-of-taper position at one end of the formation to a maximum value at an end-of-taper position situated along the shank further from the shank tip than is the one end.

In preferred embodiments the surface formation further comprises a like plurality of flutes respectively positioned between neighboring ribs, so that the ribs and flutes alternate around the circumference of the shank. Furthermore the depth of the flutes increases gradually from zero value at the start-of-taper position at the one end of the formation to a maximum value at the end-of-taper position.

In use, fasteners according to the invention are selected having regard to the nature of the items to be fixed together by the fastener, so that the metal sheet, or each of them if that part of the other article pierced by the fastener is also a metal sheet, is transfixed by the formatted part of the shank, that is to say the part to which the surface formation has been applied, when the fastener is driven home.

In the event that the fastener is to be used to secure two thin metal sheets together, the end of the shank that is impacted by the hammer is preferably headed and the said surface formation extends substantially to the underside of the fastener's head, thus, in those instances wherein the end-of-taper position coincides with the other end of the surface formation, the flutes and ribs respectively reach their maximum depth and height adjacent to the head.

For preference the said surface formation is helical, thus preferred formations comprising both flutes and ribs are in the nature of a multi-start, coarse pitch thread having a crest diameter that increases gradually from a start-of-taper position at an end of the formation at or near the tip of the shank, to a maximum at an end-of-taper position nearer to the other end of the shank, and a root diameter that decreases gradually from that start-of-taper position to that end-of-taper position.

In most instances the end-of-taper position coincides with the other end of the formation, but this is not essential and there may be an untapered continuation of the formation beyond that position wherein the crest height and the flute depth remain constant.

For preference the changes in root diameter and crest diameter are not only gradual but also uniform in rate, at least until the end-of-taper position is reached, beyond which they may remain constant over a length of the shank which, in use, transfixes the piece, or pieces, of sheet metal.

The surface formation may start immediately adjacent the tip, but preferably there is a length of plain shank extending from the tip to the start-of-taper position.

BRIEF DESCRIPTION OF THE DRAWINGS

By way of example, several embodiments of the above described invention are described in more detail hereinafter with reference to the accompanying drawings.

DESCRIPTION OF THE PREFERRED EMBODIMENTS

Figure 3:

In all instances, except for the FIG. 3 embodiment, which is headless, the illustrated fasteners are generally in the form of a nail having a constant diameter shank with a head at one end. The shank may have a pointed tip and may be plain, that is to say, devoid of any surface formation, for some distance from the tip. In manufacture, an initially plain cylindrical shank may have a plurality, say five, of helical flutes rolled into it so as to produce five equiangularly spaced apart helical ribs between the respective flutes. Thus the flutes are recessed relative to the original shank surface and the ribs are elevated relative to the original shank surface. The flutes and ribs together constitute a surface formation, as that term is used herein, in the form of a multi-start, helical thread extending from the end of the plain portion of the shank remote from the tip towards the other, in most instances headed, end of the shank.

Figure 4:
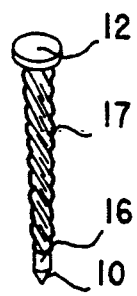

Except for the FIG. 4 embodiment, in which the surface formation extends for substantially the full length of the shank, the helical formation may be pitched so as to produce no more than one full turn, or thereabouts, over the length of the formatted portion of the shank. The roll forming dies are such that each flute commences (at the flute's end nearer to the tip end of the shank) with zero penetration, and the degree of penetration increases gradually as the distance from the tip increases, at least until a maximum value is reached, which may be maintained for a short end part of the surface formation. As the penetration increases, that is to say as the depth of the flutes increases, the amount of displaced metal forming the ribs increases and the crest diameter of the ribs similarly increases.

Figure 1:
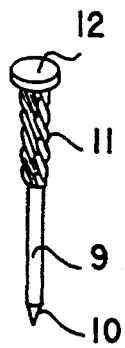
FIGS. 1 to 6 are perspective views of different fasteners, each in accordance with the invention.

The FIG. 1 embodiment may be regarded as a general purpose fastener according to the invention. It comprises a plain shank portion 9 having a pointed tip 10, and a formatted shank portion 11 extending from its junction with the plain portion 9 to the underside of a head 12. That junction is the start-of-taper position of this embodiment whereat the crest diameter of the ribs of the formation equals the shank diameter. The crest diameter increases steadily from that position to a maximum at the end-of-taper position, coinciding with the end of the formation immediately under the head 12. The root diameter of the flutes of the formation likewise decreases steadily from that junction to a minimum immediately under the head 12.

The head 12 is circular except for a missing segment. This enables the fasteners to be closely stacked in a nail gun magazine. In other embodiments other conventional heads may be provided.

On driving the fastener through a metal sheet, for example a flange of a roll-formed, sheet metal structural member, the sheet is pierced by the tip 10 and a relatively ragged hole is formed, through which the smooth shank portion 9 proceeds. That hole has a "diameter" appreciably less than the maximum crest diameter of the ribs. As the crests of the ribs engage the edges of that hole they gradually displace the metal of the sheet and the displaced metal may gradually flow into the flutes of the fastener without further tearing. The end result is a ribbed fastener extending through a tight fitting hole in the sheet.

The sheet may be in contact with the head or spaced some distance therefrom, depending on the nature of the article being fixed to the sheet, but, in use, a fastener would be chosen of such a size that the sheet will always be well away from the junction between the plain portion 9 and the formatted portion 11 of the shank and be transfixed by the formatted portion 11. Furthermore, the sheet will be positioned at the largest rib diameter it meets during the driving process.

The other illustrated embodiments are generally similar to the FIG. 1 embodiment and their natures will be largely self-evident, thus corresponding parts are correspondingly numbered in the several figures unless specifically referred to below, and not further described.

Figure 2:
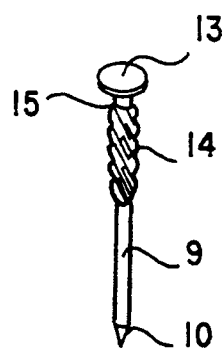

The FIG. 2 embodiment is adapted to be used to secure plaster board or the like to a sheet metal wall stud. To that end it has a fully circular head 13 that is thinner than the general purpose flat head 12. For this usage it is not necessary for the formatted ribbed and fluted portion 14 of the shank to extend fully to the underside of the head, and for ease of manufacture a short unribbed portion 15 may be immediately under the head 13. The end-of-taper position coincides with the head end of the formation.

The FIG. 3 embodiment is generally similar to the FIG. 1 embodiment except for the absence of a head. It is used typically for securing skirting and similar trimming strips in place.

The FIG. 4 embodiment has a very short smooth shank portion 16 by comparison with that of the FIG. 1 embodiment, and a correspondingly longer formatted portion 17.

Figure 5:
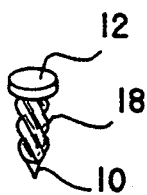

The FIG. 5 embodiment is short, of relatively large diameter, and its shank 18 is wholly formatted. It may be used to secure two pieces of sheet metal flatly against each other, for example, to form the joints between roll-formed sheet metal structural members in roof trusses, wall frames and other frameworks.

Figure 6:
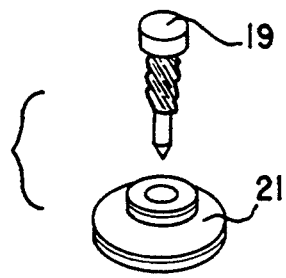

The FIG. 6 embodiment is generally similar to the FIG. 1 embodiment but has a relatively short shank and a relatively thick head 19. It may be used, in conjunction with a neoprene or other resilient sealing washer 21, to fasten wall and roof cladding sheets of metal to sheet metal supporting members where the cladding sheet lies flatly against the supporting member at the position of the fastener.

Figure 7A:
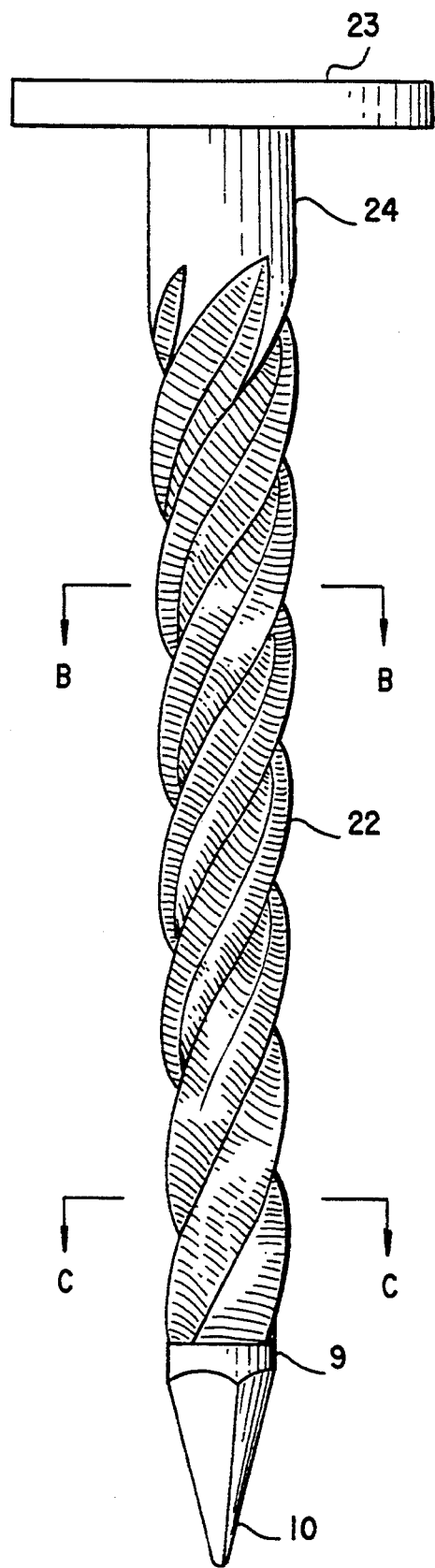
FIGS. 7 (a) is a perspective view according to another aspect of the invention and FIGS. 7 (b) and 7 (c) are cross-sectional views of FIG. 7 (a).
Figure 7B:
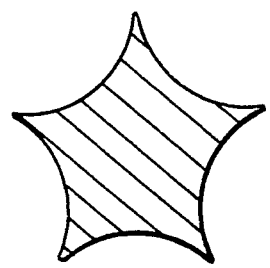
Figure 7C:
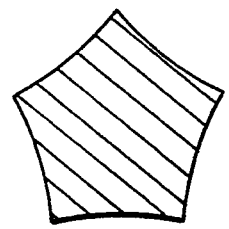

The FIG. 7(a)–7(c) embodiment is intended for the fixture of corrugated roof or wall cladding panels to sheet metal supports, and is a good example of the selection of the position and length of the formatted shank portion to suit the intended use, so as to ensure that the sheet metal is transfixed by a formatted portion of the shank wherever the fastening relies on the frictional grip between the two.

Figure 8:
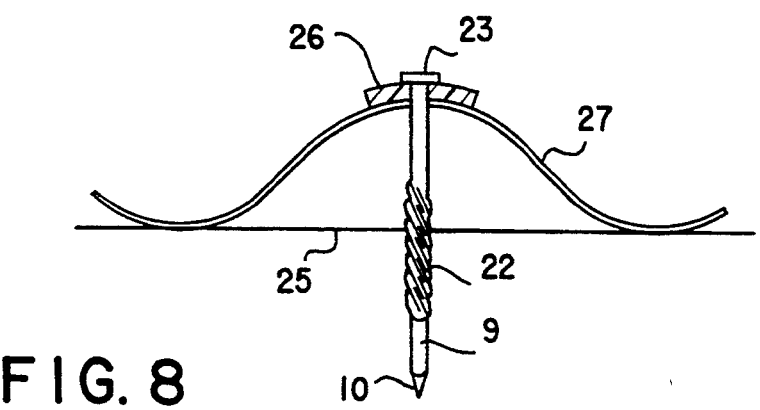
FIG. 8 is a side elevation of the fastener of FIG. 7 shown in use affixing a corrugated steel cladding panel to a sheet metal support.

The FIG. 7(a) fastener has a relatively long shank with a more or less centrally placed formatted portion 22 spaced from the head 23 by a relatively long plain portion 24. FIG. 8 shows the FIG. 7(a) fastener in use, holding a corrugated roofing panel 27 to a flange 25 of a sheet metal purlin. The hole in the crest of the panel's corrugation is sealed by a sealing washer 26 in conventional manner. The flange 25 is located well within the ambit of the formatted portion 22, but towards the larger diameter end thereof. FIG. 7(b) and 7(c) show cross-sections of the fastener in FIG. 7(a).

The efficacy of fasteners according to the invention may be seen from the following summary and results of comparative tests between nails according to the invention and commercially available plain and parallel fluted shank nails.

All the nails were of nominally the same shank diameter. Each nail was hammered through sheet steel test pieces sandwiched between two plates with 20 mm diameter clearance holes for the nails. The sheet steel test pieces were cut from commercially available coated steel strip of the same nominal hardness and strength. Three series of tests were run using test pieces having thicknesses of 0.6 mm, 0.75 mm and 1.0 mm respectively.

The nails were withdrawn by pushing onto the point, and the maximum load before the nail released was recorded. A minimum of five tests was performed for each case—ten for the nails in accordance with the invention in the case of the two thinner steels.

The test nails were both helically fluted and ribbed, with five of each. The standard spiral shank nail was of course untapered and had six ribs.

The results showing the mean and maximum connection strengths in Newtons that were recorded in each instance are tabulated below.

| Base Metal Thickness (mm) | CONNECTION STRENGTH (N) | | |
|---|---|---|---|
| | Nail of the Invention | Plain shank nail | Conventional fluted shank nail |
| 0.6 | | | |
| mean value | 260 | 104 | 121 |
| max. value | 314 | 126 | 141 |
| 0.75 | | | |
| mean value | 315 | 184 | 97 |
| max. value | 426 | 212 | 102 |
| 1.0 | | | |
| mean value | 479 | 223 | 216 |
| max. value | 574 | 272 | 348 |

I claim:

1. An impact drivable fastener to be driven into a thin metal article, said fastener comprising:

a shank extending from a pointed tip to a shank end, wherein a surface formation comprising a plurality of sharply crested, helical ribs, said ribs extending along at least a part of said shank, and wherein a height of the ribs increases gradually from zero value at a start-of-taper position at one end of the formation to a maximum value at an end-of-taper position situated along the shank further from said pointed tip than is said start-of-taper position, and wherein said surface formation further comprises a like plurality of helical flutes respectively positioned between neighboring ribs, so that the ribs and flutes alternate around a circumference of the shank, and wherein a depth of the flutes increase gradually from zero value at said start-of-taper position to a maximum value at said end-of-taper position.

2. A fastener according to claim 1, wherein a rate of increase of the height of the ribs, from said start-of-taper position to said end-of-taper position, is uniform.

3. A fastener according to claim 1 wherein a rate of increase in the depth of the flutes, from said start-of-taper position to said end-of-taper position, is uniform.

4. A fastener according to claim 1 further comprising a head on said shank end.

5. A fastener according to claim 4 wherein said end-of-taper position is immediately adjacent said head.

6. A fastener according to claim 1 wherein said maximum values remain unchanged over a length of said shank extending from said end-of-taper position towards said shank end.

7. A fastener according to claim 1 wherein said start-of-taper position is immediately adjacent said pointed tip.

8. A fastener according to claim 1 wherein said depth of said flutes and said height of said ribs being measured from an original surface of said shank, said original surface representing said zero value.

* * * * *